US007027070B2

(12) United States Patent
Makinen

(10) Patent No.: US 7,027,070 B2
(45) Date of Patent: Apr. 11, 2006

(54) SYSTEMS AND METHODS FOR MANIPULATING A GRAPHICAL DISPLAY OF A PRINTED CIRCUIT BOARD MODEL FOR AN AUTOMATED X-RAY INSPECTION SYSTEM

(75) Inventor: Bruce Allan Makinen, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 465 days.

(21) Appl. No.: 09/997,859

(22) Filed: Nov. 29, 2001

(65) Prior Publication Data

US 2003/0098889 A1    May 29, 2003

(51) Int. Cl.
*G09G 5/12* (2006.01)
(52) U.S. Cl. .................................... 345/619
(58) Field of Classification Search ................ 345/619, 345/653, 652, 650, 654, 663, 664, 678, 679, 345/810, 629, 672, 660
See application file for complete search history.

(56) References Cited

U.S. PATENT DOCUMENTS

| | | | | | |
|---|---|---|---|---|---|
| 4,868,785 | A | * | 9/1989 | Jordan et al. ................ | 345/440 |
| 5,307,451 | A | * | 4/1994 | Clark ........................... | 345/427 |
| 5,371,851 | A | * | 12/1994 | Pieper et al. ................ | 345/501 |
| 5,912,668 | A | * | 6/1999 | Sciammarella ............... | 345/788 |
| 6,138,270 | A | * | 10/2000 | Hsu ............................ | 717/125 |
| 6,259,382 | B1 | * | 7/2001 | Rosenberg .................... | 341/20 |
| 6,317,116 | B1 | * | 11/2001 | Rosenberg et al. .......... | 345/701 |
| 6,470,482 | B1 | * | 10/2002 | Rostoker et al. .............. | 716/6 |
| 6,760,890 | B1 | * | 7/2004 | Makinen ........................ | 716/4 |
| 6,825,856 | B1 | * | 11/2004 | Fazzio et al. ................ | 345/646 |
| 2002/0015520 | A1 | * | 2/2002 | Roder ......................... | 382/147 |
| 2002/0124120 | A1 | * | 9/2002 | Dixon et al. ................... | 710/1 |
| 2003/0016859 | A1 | * | 1/2003 | Weisgerber et al. ......... | 382/150 |
| 2003/0082898 | A1 | | 5/2003 | Primrose ..................... | 438/613 |
| 2003/0098876 | A1 | * | 5/2003 | Makinen ..................... | 345/705 |
| 2003/0098890 | A1 | * | 5/2003 | Makinen ..................... | 345/810 |
| 2003/0098893 | A1 | * | 5/2003 | Makinen ..................... | 345/853 |
| 2003/0192032 | A1 | * | 10/2003 | Andrade et al. ............ | 717/124 |

OTHER PUBLICATIONS

Nicola Chiari, Labview Technical Resource, vol. 11, No. 1, 1996.*

* cited by examiner

*Primary Examiner*—Jeffery A. Brier
*Assistant Examiner*—J. Amini

(57) ABSTRACT

Systems and methods for manipulating a graphical display are provide. One embodiment comprises a method for manipulating a graphical display. Briefly described, one such method comprises the steps of: providing a graphical user interface comprising a first portion for providing a graphical display, the graphical display comprising a plurality of image objects; receiving a user selection of a first image object in the first portion of the graphical user interface; displaying a target area containing the first image object selected; receiving a user selection of a second image object in the first portion of the graphical user interface; and modifying the displayed target area such that the target area contains the first and second image objects.

27 Claims, 11 Drawing Sheets

SYSTEMS AND METHODS FOR MANIPULATING A GRAPHICAL DISPLAY OF A PRINTED CIRCUIT BOARD MODEL FOR AN AUTOMATED X-RAY INSPECTION SYSTEM

TECHNICAL FIELD

The present invention is generally related to computer models for a printed circuit board and, more particularly, is related to systems and methods for manipulating a graphical display of a printed circuit board model for an automated x-ray inspection system.

BACKGROUND OF THE INVENTION

Currently, a variety of systems and/or processes are used for inspecting manufacturing defects in printed circuit boards. Printed circuit boards typically include one or more electrical components (e.g., computer chips, capacitors, etc.) soldered to an integrated circuit (IC). For many years, the de facto process for production of printed circuit board assemblies included manual visual inspection (MVI) after soldering, followed by an electrical test, such as in-circuit testing (ICT), at the end of the assembly process to isolate any defects that occurred during manufacturing. Typically, a final functional test was run to verify that the printed circuit board operated properly before it was integrated into a final product.

As the need for more complex printed circuit boards having more components increased, automated inspection systems became popular. Such inspection systems typically comprise a printed circuit board modeling system, an imaging system, and a control system. Typically, the modeling system is used to generate a computer model of a printed circuit board that is to be mass-produced. The imaging system comprises hardware and/or software for capturing an image of the manufactured printed circuit board. Currently, image systems employ a variety of imaging techniques (e.g., x-ray, optical, ultrasonic, thermal image, etc.). The control system typically receives a file containing a computer model of the particular printed circuit board from the modeling system. Based on the computer model, the control system may generate an inspection program to be implemented by the imaging system. The inspection program may be used to image a manufactured printed circuit board, which is based on the computer model generated by the modeling system. After the imaging system generates the images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

Control systems implemented in current PCB inspection systems typically employ a graphical user interface to assist in generating the inspection program to be implemented by the imaging system and for interfacing with the PCB modeling system. The graphical user interface typically includes a portion for providing a graphical display comprising one or more image objects which may comprise, for example, the model of the printed circuit board. The graphical user interface, and a computer program associated with the control system that supports the graphical user interface, may also be configured to enable a user to select various image objects in the graphical display. For instance, in the graphical display of a model of a printed circuit board, the one or more image objects may comprise a particular component on the PCB, a pin on a particular component, etc.

For a number of reasons, the computer program may be configured such that user selection of image objects is limited to within the boundary of one or more target areas, which may also be displayed on the graphical display. In other words, typically a user is not able to select image objects that are not included within the target area. For instance, the target area on the graphical user interface may correspond to, for example, a portion of the printed circuit board to be imaged by the x-ray imaging system. From the perspective of the graphical user interface, the target area defines the available image objects that a user may select. From the perspective of the x-ray imaging system, the target area defines an area to be imaged. Thus, limiting user selection of image objects to the target area may be a means for controlling the x-ray imaging system.

By way of example, consider a situation where the target area is located within the graphical display in such a way that a large percentage of the target area does not contain an image object to be selected by the user. This situation may be problematic for several reasons. It may be advantageous to locate the target area such that the percentage of the target area containing image objects is maximized. This may be beneficial in order to capture a useful image (e.g., one which contains many components, pins, solder joints, etc. to be inspected for defects) for inspection purposes. Although the computer program may be configured to enable the user to manually relocate the target area in the graphical display, this iterative and manual process may be bothersome and time-consuming to users.

Thus, there is a need in the industry for improved systems and methods for managing interaction with a presentation of a tree structure in a graphical user interface.

SUMMARY OF THE INVENTION

The present invention provides systems and methods for manipulating a graphical display.

The present invention may be viewed as a method for manipulating a graphical display. Briefly described, one such method comprises the steps of: providing a graphical user interface comprising a first portion for providing a graphical display, the graphical display comprising a plurality of image objects; receiving a user selection of a first image object in the first portion of the graphical user interface; displaying a target area containing the first image object selected; receiving a user selection of a second image object in the first portion of the graphical user interface; and modifying the displayed target area such that the target area contains the first and second image objects.

The present invention may also be viewed as a method for manipulating a graphical display of a printed circuit board model. The printed circuit board model is adapted to be used in an automated x-ray inspection system for detecting defects in a manufactured printed circuit board, which includes one or more components each comprising one or more pins soldered to the printed circuit board. Briefly described, one such method comprises the steps of: providing a graphical user interface comprising a first portion for providing a graphical display of a printed circuit board model comprising a plurality of image objects associated with a printed circuit board; receiving a user selection of a first image object in the first portion of the graphical user interface; displaying a target area containing the first image object selected; receiving a user selection of a second image object in the first portion of the graphical user interface; and modifying the displayed target area such that the target area contains the first and second image objects.

The present invention may also be viewed as a computer program embodied in a computer-readable medium for manipulating a graphical display of a printed circuit board model. The printed circuit board model is adapted to be used in an automated x-ray inspection system for detecting defects in a manufactured printed circuit board, which includes one or more components each comprising one or more pins soldered to the printed circuit board. Briefly described, the computer program comprises logic configured to: provide a graphical user interface comprising a first portion for providing a graphical display of a printed circuit board model comprising a plurality of image objects associated with a printed circuit board; receive a user selection of a first image object in the first portion of the graphical user interface; display a target area containing the first image object selected; receive a user selection of a second image object in the first portion of the graphical user interface; and modify the displayed target area such that the target area contains the first and second image objects.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
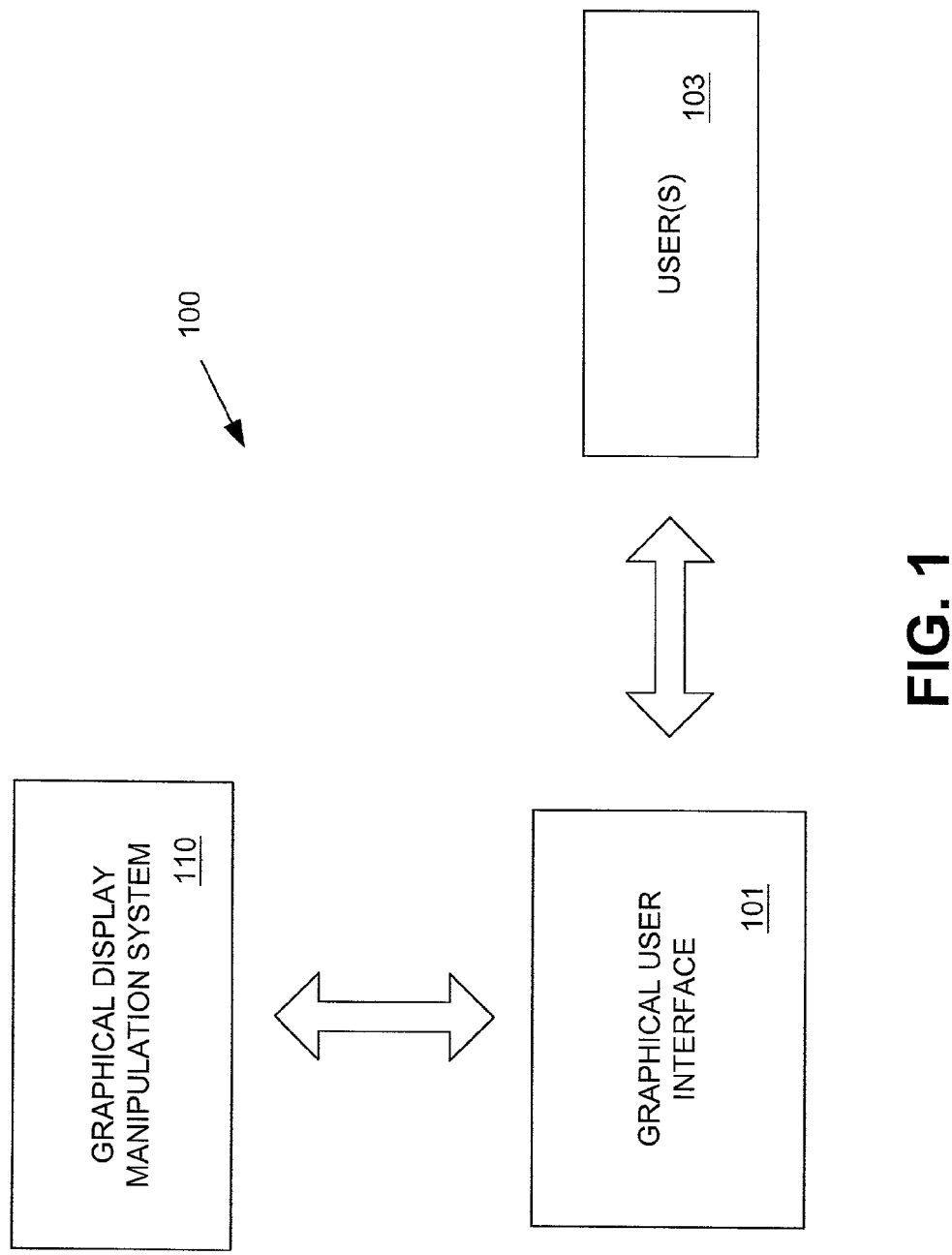
FIG. 1 is a block diagram of an embodiment of a system for manipulating a graphical display according to the present invention.

FIG. 1 is a block diagram of a system 100 in which an embodiment of a graphical display manipulation system 110 of the present invention may be implemented. As illustrated in FIG. 1, graphical display manipulation system 110 supports a graphical user interface 101 configured for interaction with a user 103. In general, graphical display manipulation system 110 provides graphical user interface 101 comprising a portion for providing a graphical display of one or more image objects which may comprise, for example, a model of a printed circuit board. For instance, in the graphical display of a model of a printed circuit board, the one or more image objects may comprise a particular component on the printed circuit board, a pin on a particular component, a solder joint, etc. Graphical display manipulation system 110 may also be configured such that selection of the image objects by user 103 is limited to within the boundary of one or more target areas, which may also be displayed on the graphical display. The size, shape, location, operation, etc. of the target area may be defined by graphical display manipulation system 110 or any other external system. One of ordinary skill in the art will appreciate that there may be a number of situations in which it is advantageous to limit user selection of image objects to the target area.

In general, graphical display manipulation system 110 manipulates the display of the target area in response to user selections of image objects in the graphical display. More specifically, graphical display manipulation system 110 automatically manipulates the target area, in response to selection of an image object, such that the target area contains the maximum number of selectable image objects. For example, in a graphical display where all image objects are of equal size and arranged uniformly, graphical display manipulation system 110 may be configured to automatically center a symmetrical target area with respect to the image objects selected. One of ordinary skill in the art will appreciate that the maximum number of selectable image objects in the target area may depend on any of a variety of factors. For example, graphical display manipulation system 110 may maximize the number of selectable image objects in the target area based on any of the following, or other, variables: the size, shape, location, etc. of the target area; the size, shape, distribution, etc. of the selected image objects; the size, shape, distribution, etc. of the unselected image objects; etc.).

Figure 2:
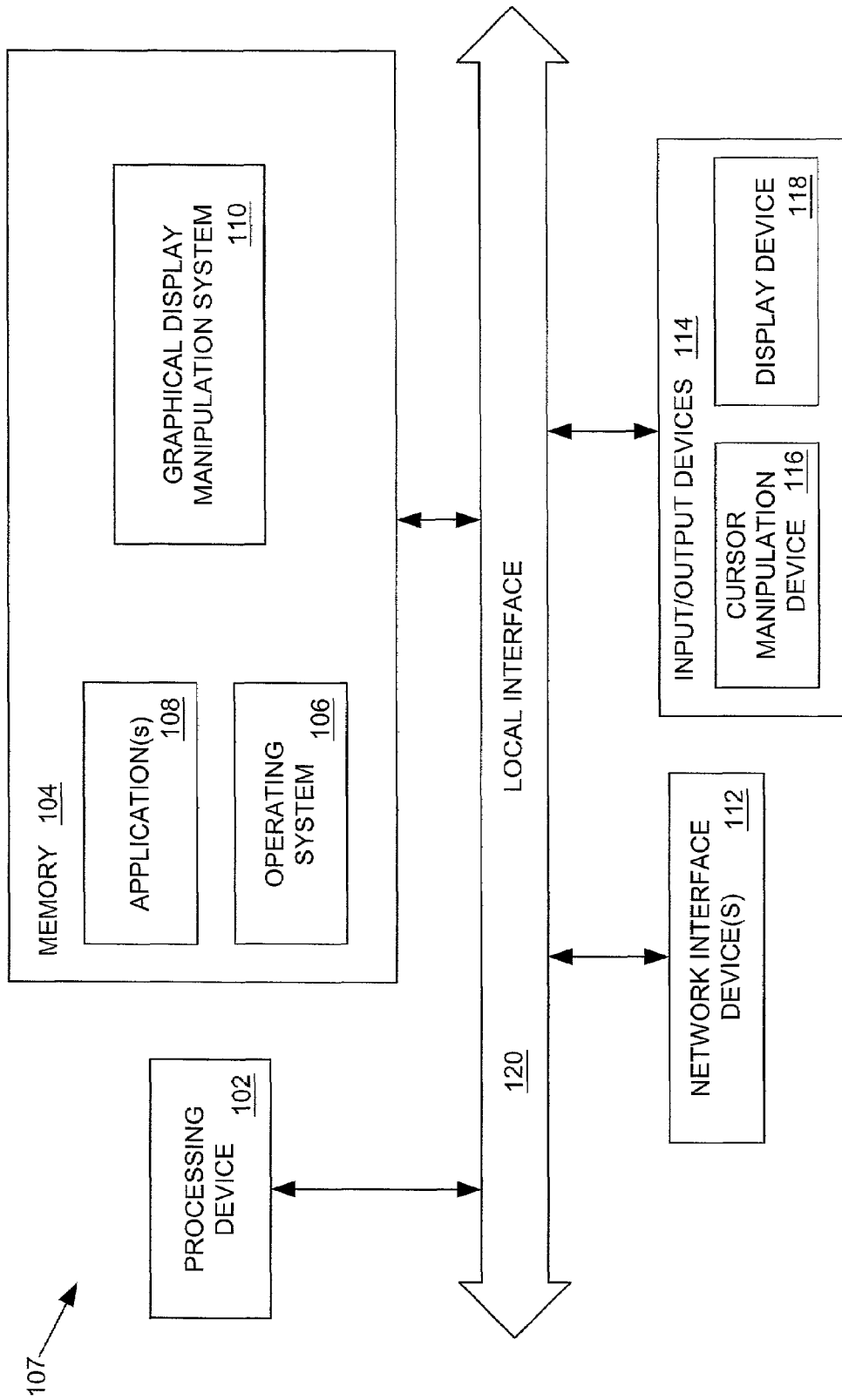
FIG. 2 is a block diagram of an embodiment of a system including an embodiment of a graphical display manipulation system of the present invention.

FIG. 2 is a block diagram of an embodiment of a system 107 for implementing graphical display manipulation system 110. Graphical display manipulation system 110 may be implemented in software, firmware, hardware, or a combination thereof In the embodiment illustrated in FIG. 2, graphical display manipulation system 110 is implemented in software, as an executable program, which is executed by a processing device 102. Generally, in terms of hardware architecture, as shown in FIG. 2, system 100 comprises a processing device 102, memory 104, one or more network interface devices 112, and one or more input and/or output (I/O) devices 114 interconnected via a local interface 120. System 107 may further comprise additional components not illustrated in FIG. 2.

Referring again to FIG. 2, the various components of system 107 will be described. Local interface 120 may be, for example but not limited to, one or more buses or other wired or wireless connections. The local interface 120 may have additional elements, which are omitted for simplicity, such as controllers, buffers (caches), drivers, repeaters, and receivers, to enable communications. Furthermore, the local interface 120 may include address, control, and/or data connections to enable appropriate communications among the aforementioned components.

Processing device 102 is a hardware device for executing software, particularly that stored in memory 104. Processing device 102 may be any custom-made or commercially-available processor, a central processing unit (CPU), an auxiliary processor among several processors associated with system 100, a semiconductor based microprocessor (in the form of a microchip or chip set), a macroprocessor, or generally any device for executing software instructions.

As illustrated in FIG. 2, memory 104 may comprise an operating system 106, one or more applications 108, and graphical display manipulation system 110. The architecture, operation, and/or functionality of graphical display manipulation system 110 will be described in detail below. Memory 104 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 104 may incorporate electronic, magnetic, optical, and/or other types of storage media. Furthermore, memory 104 may have a distributed architecture, in which various components are situated remote from one another, but can be accessed by processing device 102.

The software in memory 104 may include one or more separate programs, each of which comprises executable instructions for implementing logical functions. In the example of FIG. 2, the software in memory 104 includes graphical display manipulation system 110 according to the present invention. Memory 104 may further comprise a suitable operating system 106 that controls the execution of other computer programs, such as one or more applications 108 and graphical display manipulation system 110, and provides scheduling, input-output control, file and data management, memory management, and communication control and related services.

Graphical display manipulation system 110 may be a source program, executable program (object code), script, or any other entity comprising a set of instructions to be performed. When implemented as a source program, then the program needs to be translated via a compiler, assembler, interpreter, or the like, which may or may not be included within the memory 104, so as to operate properly in connection with operating system 106. Furthermore, graphical display manipulation system 110 may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

Network interface device(s) 118 may be any device configured to facilitate communication between system 107 and a communication network, such as a public or private packet-switched or other data network including the Internet, a circuit switched network, such as the public switched telephone network, a wireless network, an optical network, or any other desired communications infrastructure.

Input/output devices 114 may comprise any device configured to communicate with local interface 120. One of ordinary skill in the art will appreciate that, depending on the configuration of system 100, input/output devices 120 may include any of the following, or other, devices: a keyboard, a mouse, display device, such a computer monitor, a serial port, a parallel port, a printer, speakers, a microphone, etc.

As illustrated in FIG. 2, system 107 may include a cursor manipulation device 116 and a display device 118. As described in detail below, graphical display manipulation system 110 may be configured to enable a user to interact with a tree structure in a graphical user interface via display device 118 and cursor manipulation device 116. Thus, one of ordinary skill in the art will appreciate that display device 118 may comprise any of the following (or other) types of devices configured to support the graphical user interface: a computer monitor, a liquid crystal display (LCD), a plasma-based display, an LED-based display, a touch-sensitive screen, such as those implemented in portable computing devices (e.g., a personal digital assistant (PDA)), and any other known or future display device, regardless of the underlying display technology. Furthermore, cursor manipulation device 116 may comprise any input device configured to cooperate with an application 108, operating system 106, and/or graphical display manipulation system 110 and manipulate a cursor displayed on the display device 118. For example, cursor manipulation device 116 may comprise a mouse, a trackball, a set of navigation keys (e.g., arrow keys), and a joystick stick, to name a few.

During operation of system 107, the processing device 102 is configured to execute logic stored within the memory 104, to communicate data to and from the memory 104, and to generally control operations of the system 107 pursuant to the software. Graphical display manipulation system 110 and operating system 106, in whole or in part, but typically the latter, are read by the processing device 102, perhaps buffered within the processing device 102, and then executed.

In embodiments where graphical display manipulation system 110 is implemented in software, as is shown in FIG. 2, graphical display manipulation system 110 may be stored on any computer-readable medium for use by or in connection with any computer related system or method. In the context of this document, a computer-readable medium may be an electronic, magnetic, optical, or other physical device or means that may contain or store a computer program for use by or in connection with a computer-related system or method. Graphical display manipulation system 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electro-magnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where graphical display manipulation system 110 is implemented in hardware, graphical display manipulation system 110 may be implemented with any or a combination of the following, or other, technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As stated above, graphical display manipulation system 110 supports a graphical user interface 101 comprising a portion for providing a graphical display. The graphical display comprises one or more image objects to be selected by a user and a target area which defines the area in which image objects may be selected by the user. More specifically, graphical display manipulation system 110 automatically manipulates the target area, in response to selection of an image object, such that the target area contains the maximum number of selectable image objects.

Figure 3:
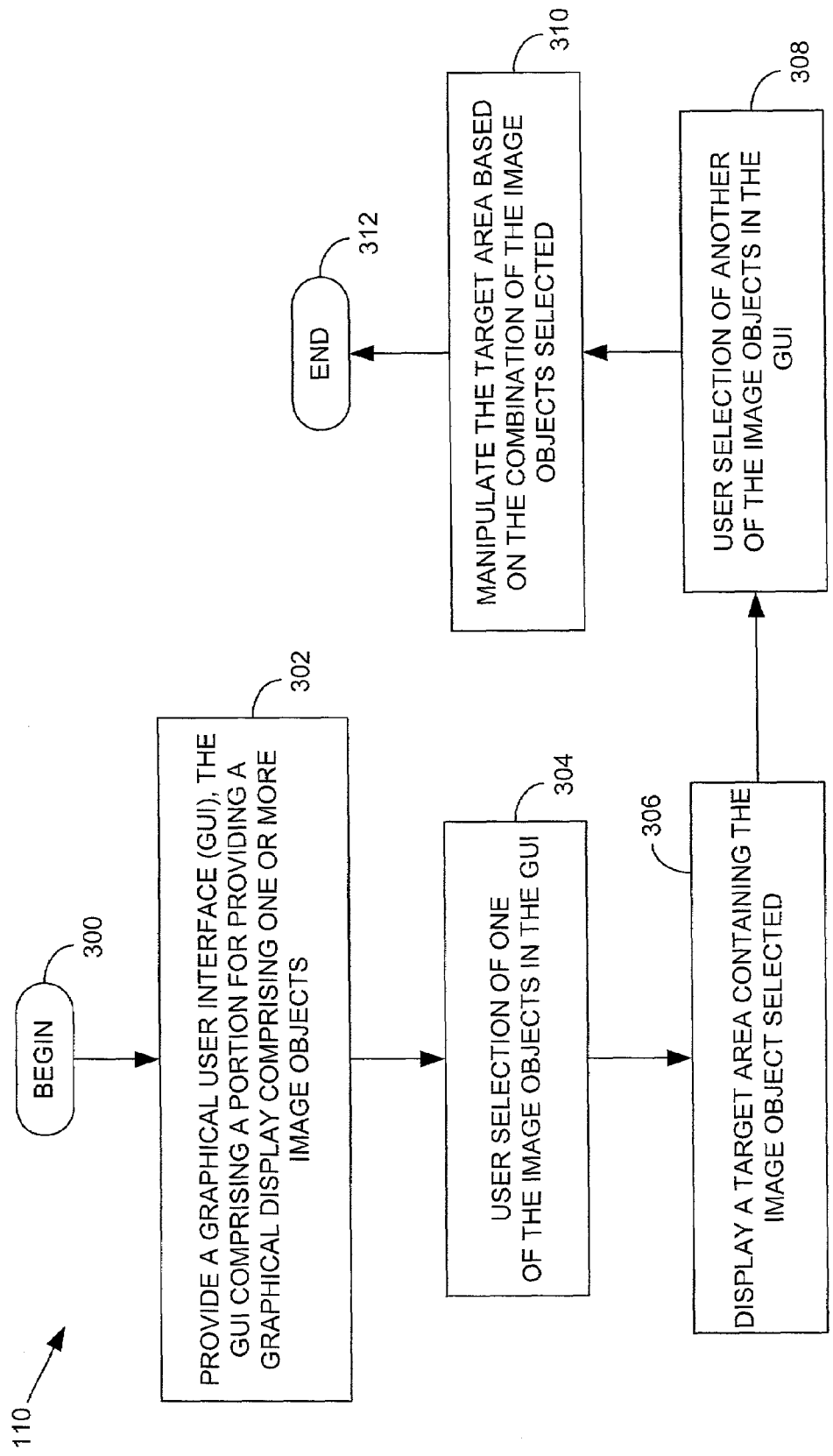
FIG. 3 is a flow chart illustrating the functionality, architecture, and/or operation of an embodiment of the graphical display manipulation system of FIGS. 1 and 2.

FIG. 3 is a flow chart illustrating the architecture, functionality, and/or operation of an embodiment of graphical display manipulation system 110. Graphical display manipulation system 110 begins at block 300. Graphical display manipulation system 110 may be initiated by a user via an I/O device 114. In certain embodiments, graphical display manipulation system 110 may be implemented as a function that may be called by operating system 106 and an application 108. In alternative embodiments, the functionality of graphical display manipulation system 110 may be seamlessly implemented within an application 108.

Regardless of the manner in which it is initiated, at block 302, graphical display manipulation system 110 provides a graphical user interface comprising a first portion for providing a graphical display. The graphical display comprises one or more image objects. Generally, an image object may be any item in the graphical display portion of the graphical user interface that may be individually, or otherwise, selected and manipulated by a user. Image objects may comprise text, shapes, pictures, etc. By way of example, graphical display manipulation system 110 may display a model of a printed circuit board, in which case the one or more image objects may comprise a particular component on the printed circuit board, a pin on a particular component, a solder joint, etc.

At block 304, graphical display manipulation system 110 enables a user to select one of the image objects. As described in more detail below, the user may select an image object by, for example, manipulating a cursor located in the graphical display and clicking a button. At block 306, graphical display manipulation system 110 displays a target area. Graphical display manipulation system 110 may display the target area after the image object is selected. In alternative embodiments, graphical display manipulation system 110 may display and/or preview the target area as the cursor is manipulated within the graphical display. In this manner, graphical display manipulation system 110 may enable a user to determine how the target area will be manipulated based on the selection of a particular image object.

Graphical display manipulation system 110 displays the target area such that the selected image object is within the target area. In certain embodiments, graphical display manipulation system 110 may be configured to automatically display the target area such that the target area is centered with respect to the selected image object. In further embodiments, graphical display manipulation system 110 may be configured to display the target area such that selected image object is within the target area and the target area contains the maximum number of image objects that have not been selected (selectable image objects). The target area may be of any size and/or shape and may be defined by graphical display manipulation system 110 or any other external system. For example, the target area may be configured as a geometric shape, such as a square, rectangle, triangle, polygon, or any other geometrical shape, or may be configured as a non-geometric shape having an irregular border.

By way of example, in certain embodiments, such as where all image objects in the graphical display are of equal size and arranged uniformly, graphical display manipulation system 110 may be configured to automatically center a symmetrical target area (e.g., a square) with respect to the image objects selected. One of ordinary skill in the art will appreciate that graphical display manipulation system 110 may determine the location of the target area in which the maximum number of selectable image objects is contained in the target area in a number of ways depending on a variety of variables. For instance, where the image objects in the graphical display are not of equal size and/or shape, where the target area is an irregular shape, and/or where the orientation of the image objects are not arranged uniformly, graphical display manipulation system 110 may be configured to calculate the maximum number of selectable objects in the target area based on a mathematical expression. Graphical display manipulation system 110 may be configured to maximize the number of selectable image objects in the target area based on any of the following, or other, variables: the size, shape, location, etc. of the target area; the size, shape, distribution, etc. of the selected image objects; the size, shape, distribution, etc. of the unselected image objects; etc.

As illustrated in blocks 308 and 310, after additional user selections of image objects within the target area, graphical display manipulation system 110 manipulates the location of the target area such that each of the image objects selected is within the target area and the number of selectable image objects in the target area is maximized as described above. As stated above, graphical display manipulation system 110 may be configured to display and/or preview the new location of the target area prior to the selection of the new image objects. For instance, a user may move the cursor over one of the selectable image objects within the target area and graphical display manipulation system 110 may temporarily display the resulting location of the target area. In this manner, a user may be able to determine whether, if one image object is selected, a second image object will be contained within the resulting target area. Graphical display manipulation system 110 terminates at block 312.

Figure 4:
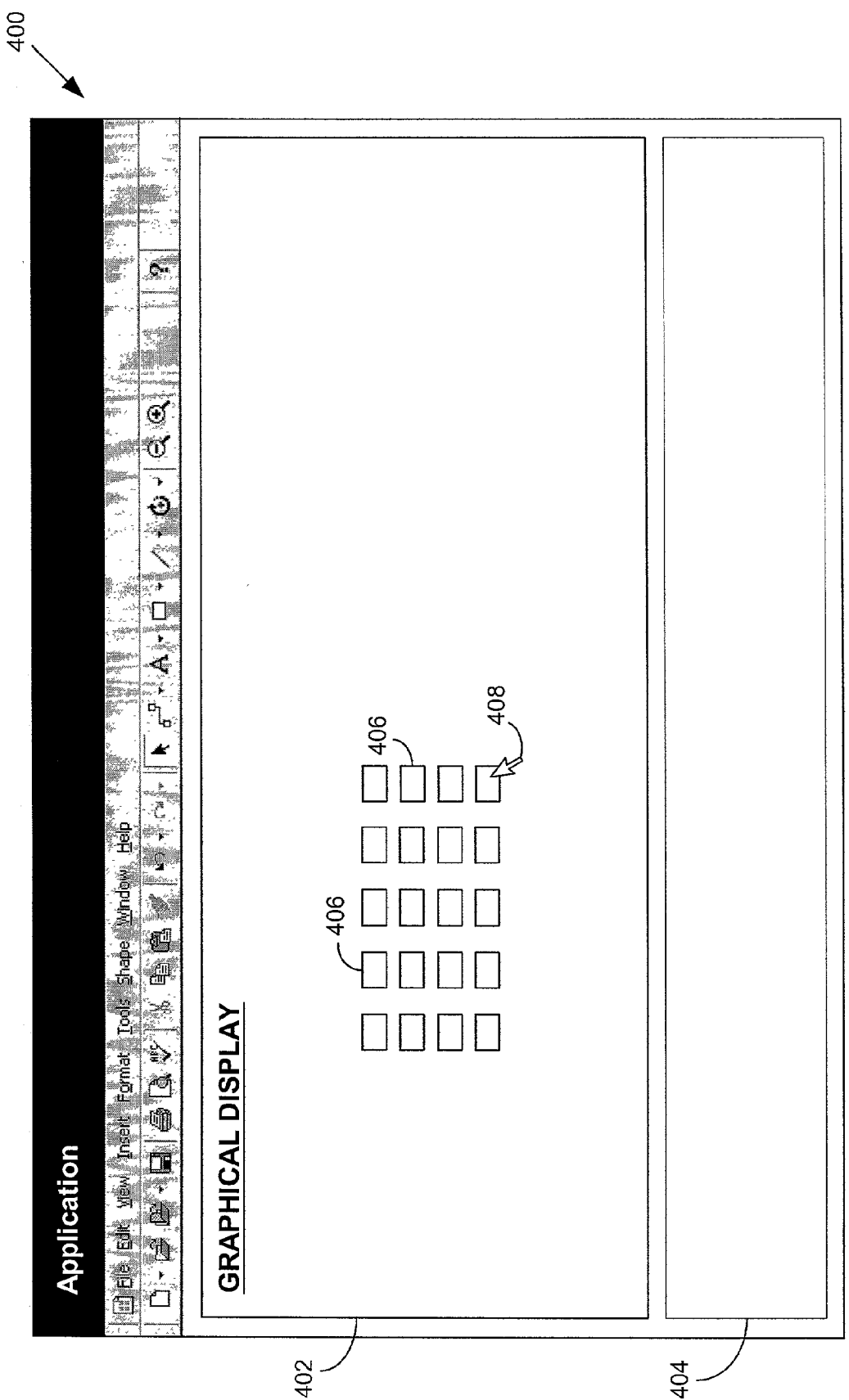
FIG. 4 is a screen shot of an embodiment of a graphical user interface generated by the graphical display manipulation system of FIGS. 1–3.

With reference to the screen shots of FIGS. 4–8 of a representative graphical user interface, a particular embodiment of graphical display manipulation system 110 will be described. FIG. 4 is a screen shot 400 of an embodiment of a graphical user interface generated by graphical display manipulation system 110. The graphical user interface may comprise a first portion 402 for providing a graphical display. The graphical user interface may comprise additional portions 404 for providing a number of other application services. As illustrated in FIG. 4, the graphical user interface may also comprise a tool bar that contains a number short-cuts for implementing common commands, as well as drop-down menus for implementing functions located under categories, such as "File," "Edit," "View," "Insert," "Format," "Tools," etc. The graphical display may comprise one or more image objects as described above. In the embodiment illustrated in FIG. 4, the image objects are represented by the numeral 406. The graphical user interface may further comprise a cursor 408, by which a user may interact with graphical display manipulation system 110, such as by moving the cursor 408 and selecting the image objects 406 in the graphical display portion 402.

Figure 5:
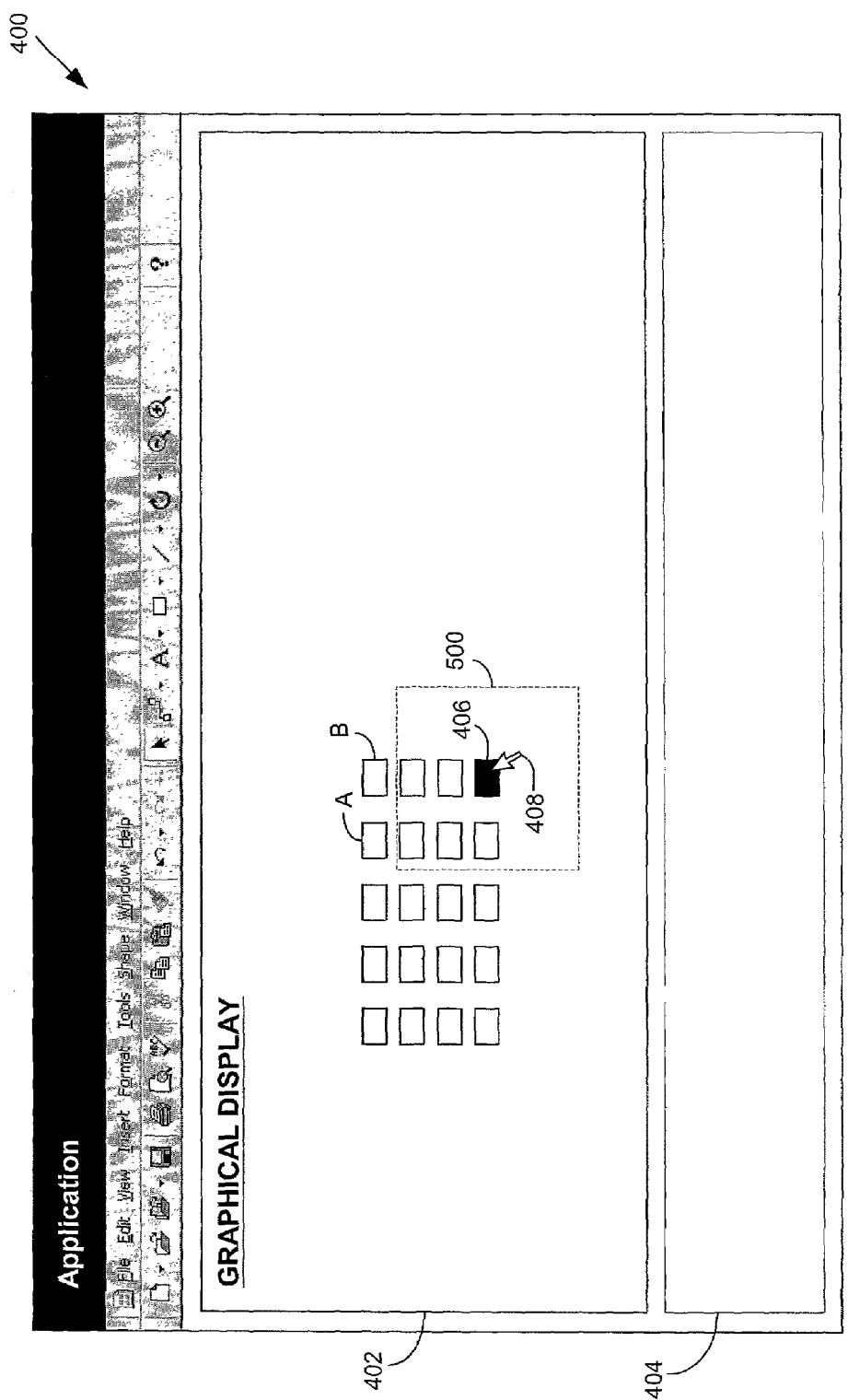
FIG. 5 illustrates the screen shot of FIG. 4 displaying a target area centered with respect to an image object selected by a user.

As illustrated in FIG. 5, graphical display manipulation system 110 enables a user to select one of the image objects 406 via cursor 408. Graphical display manipulation system 110 may visually distinguish image objects that have been selected (selected image objects) from image objects that have not been selected (selectable image objects). For instance, in the embodiment illustrated in FIG. 5, graphical display manipulation system 110 has visually distinguished the selected image object 406 in the lower-left corner by changing the color of the image object. One of ordinary skill in the art will appreciate that graphical display manipulation system 110 may be configured to visually distinguish image objects 406 in a number of other ways. As further illustrated in FIG. 5, graphical display manipulation system 110 displays a target area 500 around the selected image object 406. In the embodiment illustrated in FIG. 5, the target area 500 is automatically centered with respect to the selected image object 406.

As stated above, in alternative embodiments, graphical display manipulation system 110 may be configured to display the target area such that selected image object 406 is within the target area and the target area contains the maximum number of image objects that have not been selected (selectable image objects). For instance, as shown in FIG. 5, where the target area 500 is centered with respect to the selected image object 406, a large portion of the target area may not contain any selectable objects. Thus, in certain embodiments it may be advantageous to maximize the number of image objects 406 contained within the target area 500. Accordingly, the target area 500 may be located such that image objects 406 labeled "A" and "B" would be located within the target area 500.

Figure 6:
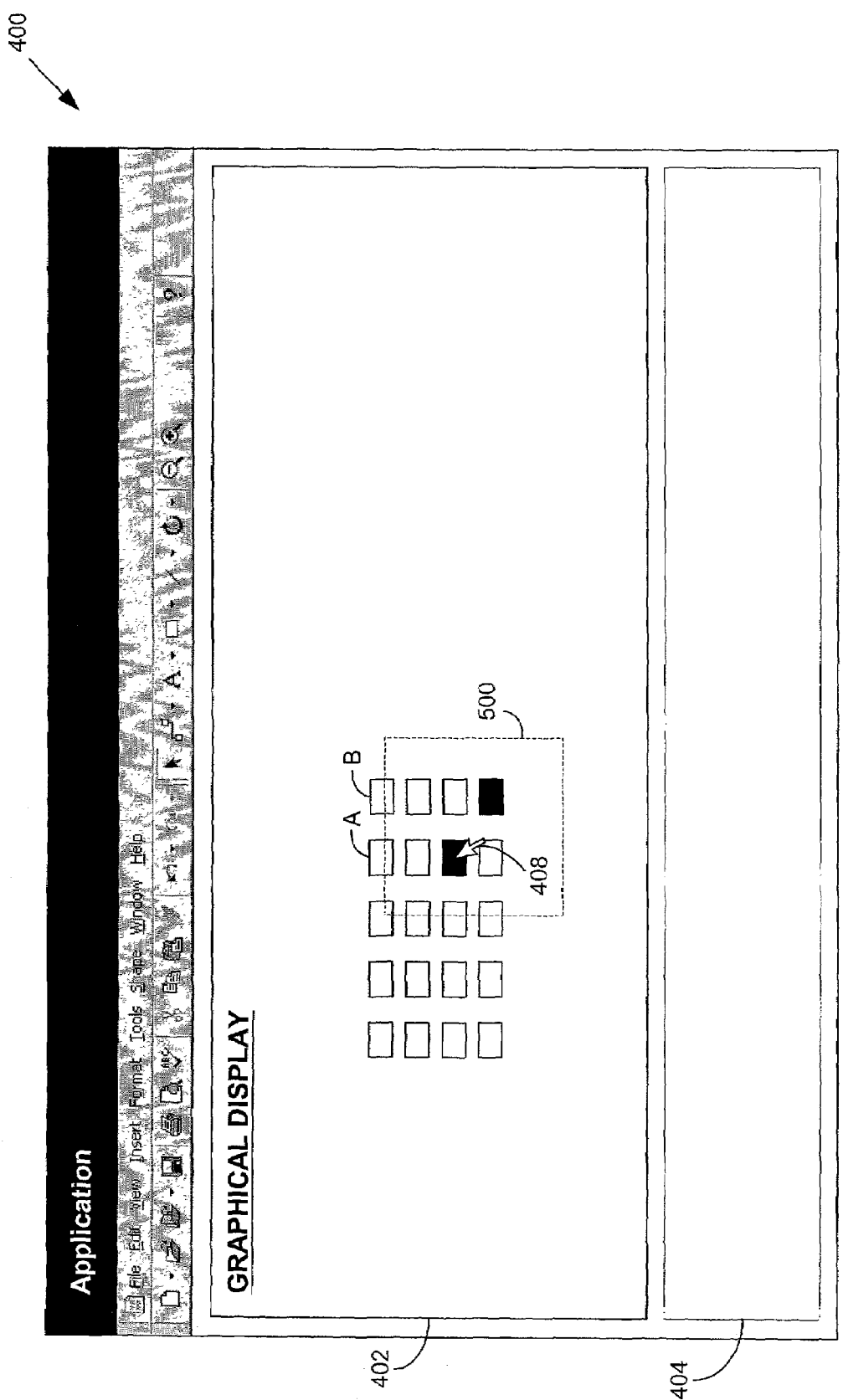
FIG. 6. illustrates the screen shot of FIG. 5 in which another image object has been selected by a user and the target area has been modified such that it is centered with respect to the two image objects.
Figure 7:
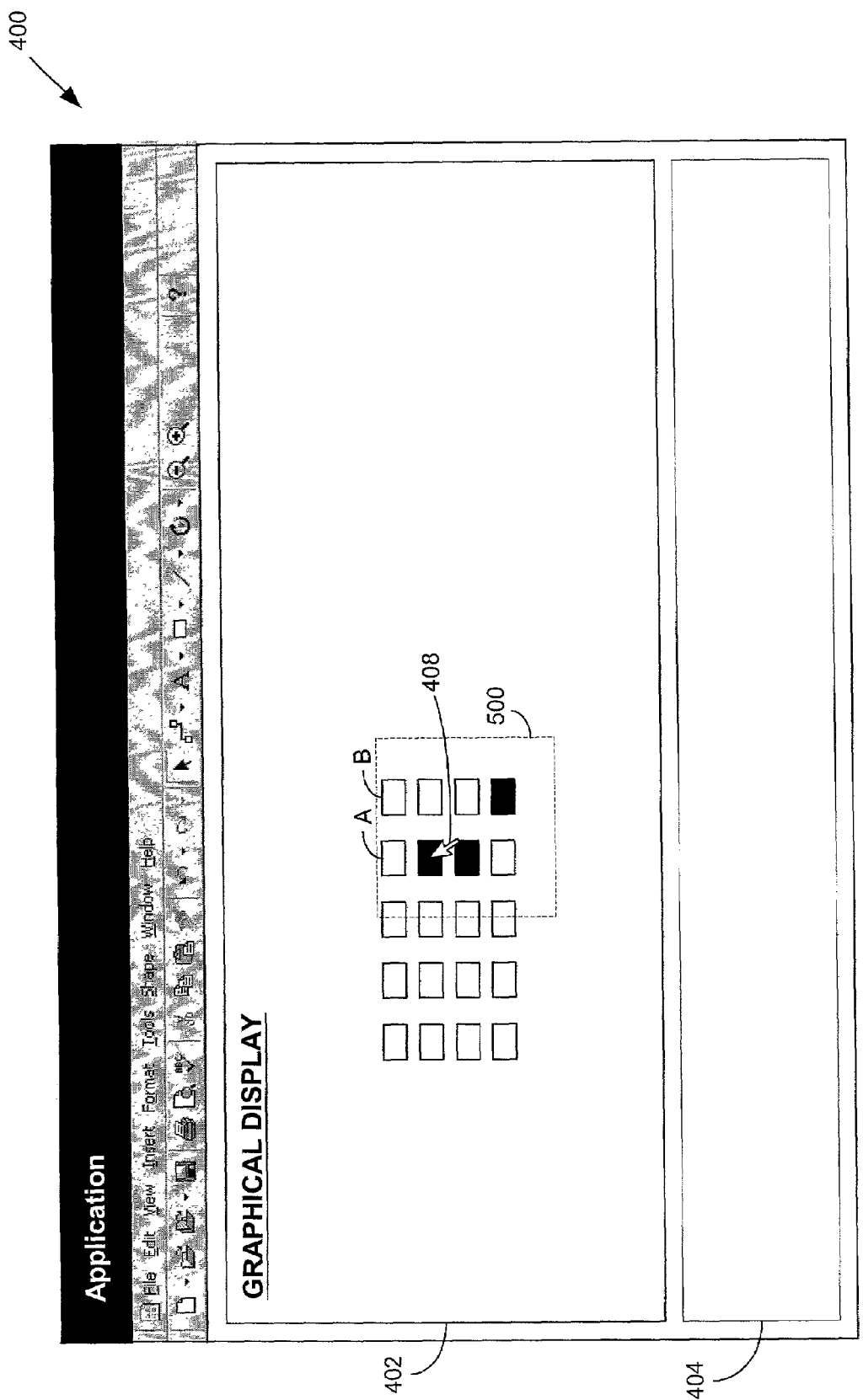
FIG. 7 illustrates the screen shot of FIG. 6 in which a third image object has been selected by a user and the target area has been modified such that it is centered with respect to the three image objects.
Figure 8:
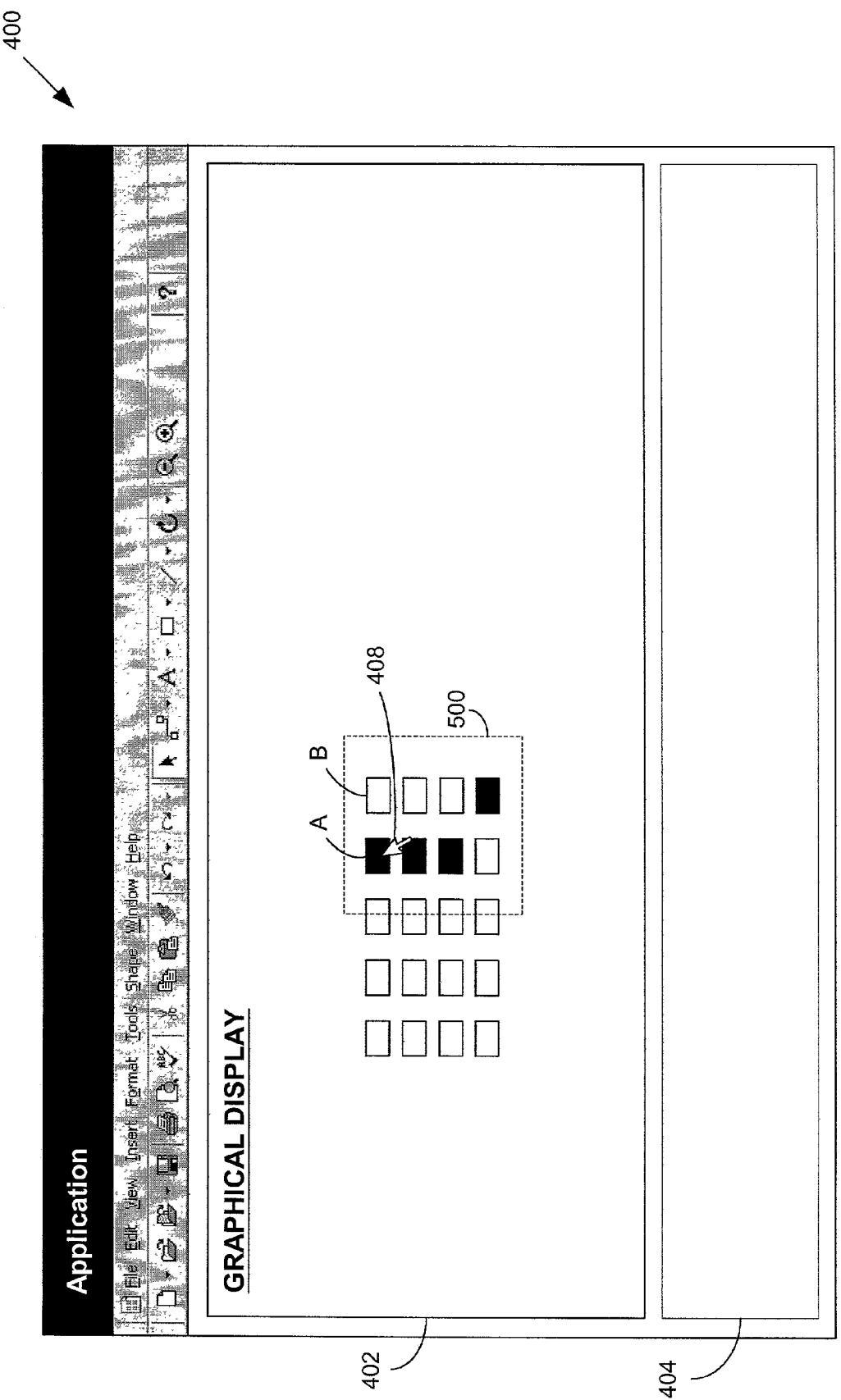
FIG. 8 illustrates the screen shot of FIG. 7 in which a fourth image object, which was not within the original target area of FIG. 5, has been selected by a user and the target area has been modified such that it is centered with respect to the four image objects.

Although graphical display manipulation system 110 may be configured to display the target area 500 such that the number of selectable image objects 406 contained within the target area 500 is maximized, the remainder of the discussion will focus on the embodiment in which the target area 500 is automatically centered with respect to the selected image objects 406. FIG. 6. illustrates the screen shot 400 of FIG. 5 in which another image object 406 has been selected by a user and graphical display manipulation system 110 has manipulated the target area 500 such that it is centered with respect to the two selected image objects. FIG. 7 illustrates the screen shot 400 of FIG. 6 in which a third image object 406 has been selected by a user and graphical display manipulation system 110 has again manipulated the target area 500 such that it is centered with respect to the three selected image objects 406. A comparison of the locations of target area 500 in FIGS. 5–7 will illustrate that the image objects 406 labeled "A" and "B" (which were not located within the original target area 500 (FIG. 5) may be selected by a user (see FIG. 8) because the target area 500 has been manipulated by graphical display manipulation system 110.

Figure 9:
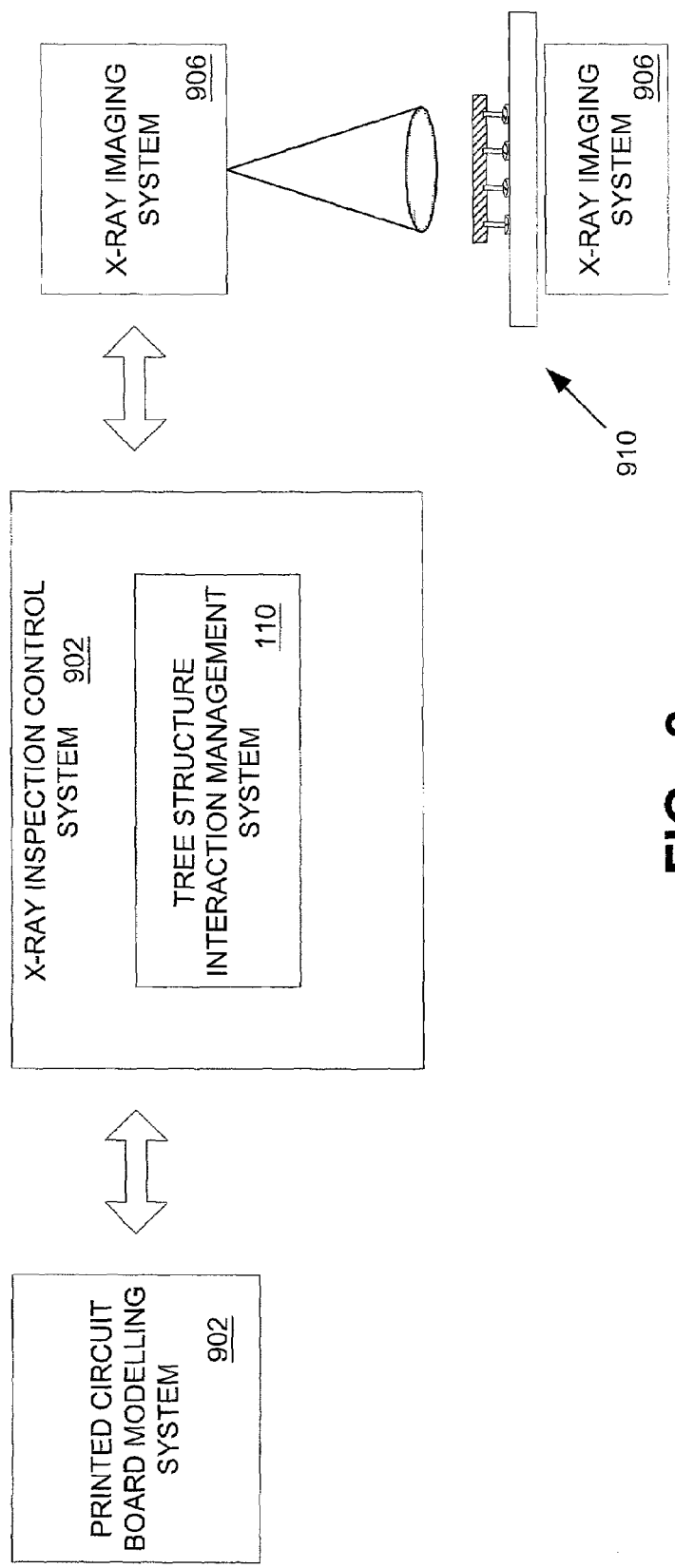
FIG. 9 is a block diagram of another embodiment of a system in which the graphical display manipulation of the present invention may be implemented.

Graphical display manipulation system 110 may be implemented in a variety of other systems and/or a variety of computer applications. FIG. 9 is a block diagram of a system 900 for inspecting manufacturing defects in printed circuit boards, in which graphical display manipulation system 110 may be implemented. System 900 comprises a printed circuit board modeling system 902, an x-ray inspection control system 904, an x-ray imaging system 906, and a printed circuit board 910. In general, PCB modeling system 902 is a system for generating a computer model of a printed circuit board. PCB modeling system 902 may be any known or later developed computer-aided design (CAD) system capable of modeling any type of printed circuit board.

Figure 10:
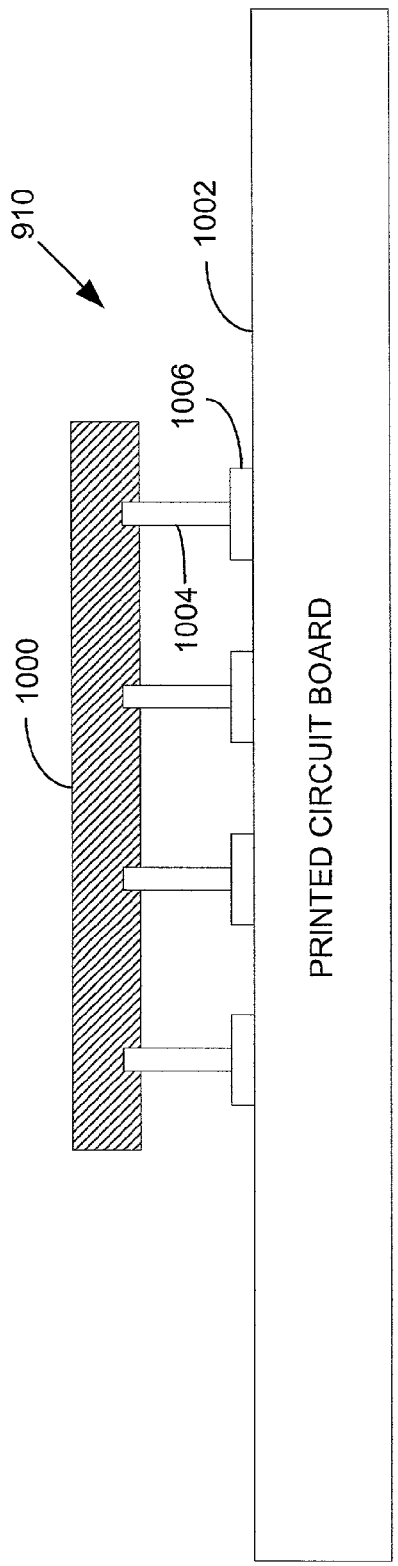
FIG. 10 is a block diagram illustrating a printed circuit board that may be inspected by the system of FIG. 9.
Figure 11:
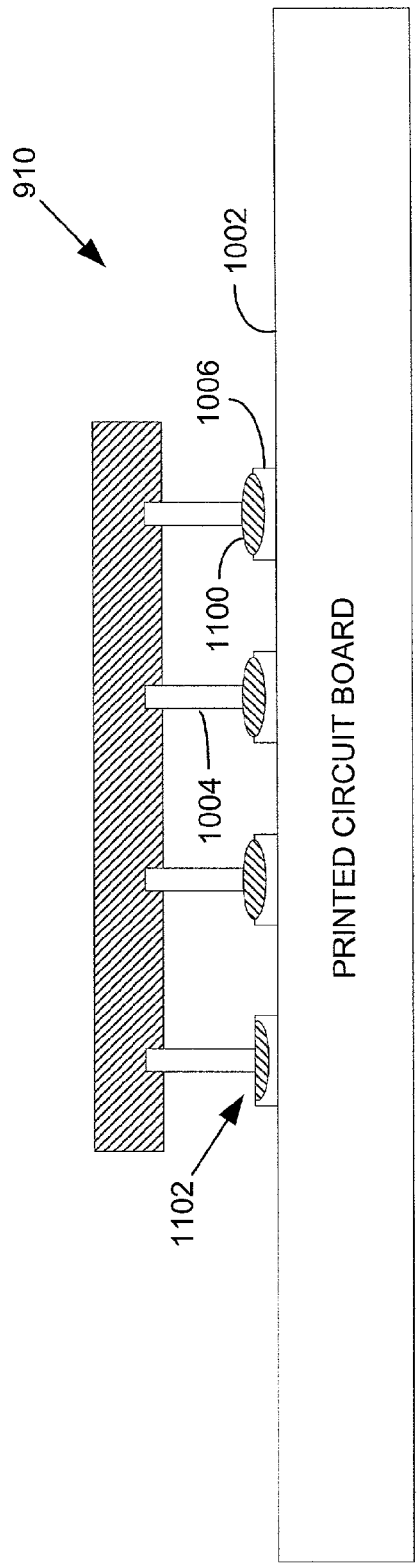
FIG. 11 is a block diagram illustrating a printed circuit board that may be inspected by the system of FIG. 9, which has a manufacturing defect.

FIGS. 10 and 11 illustrate cross-sectional diagrams of a printed circuit board 910 that may be modeled using PCB modeling system 902 and inspected using system 900. As illustrated in FIG. 10, printed circuit board 910 may comprise a component 1000 having one or more pins 1004. Component 1000 may comprise any type of electrical component for which it is desirable to solder to a PCB substrate 1002. PCB substrate 1002 includes an underlying integrated circuit (IC) that comprises a plurality of termination points 1006, which may be soldered to the pins 1004 during the manufacturing process.

As illustrated in FIG. 11, during the manufacturing process, component 1000 may be electrically connected to the termination points 1006 on the PCB substrate 1002 via a soldering material 1100. FIG. 11 illustrates printed circuit board 910 after the soldering process. By way of example, during the manufacturing process a variety of defects may result. For instance, in FIG. 11, the left-most pin 1004 may have a soldering defect (represented by reference numeral 1102). One of ordinary skill in the art will appreciate that any of the following, or other, defects may occur during the manufacturing process: open solder joints, shorts, missing components, misaligned components, insufficient solder joints, excess solder joints, reversed capacitors, solder balls, solder voids, etc.

X-ray imaging system 906 comprises imaging hardware and/or software for capturing an x-ray image of a manufactured printed circuit board. One of ordinary skill in the art will appreciate that system 900 may employ any of a variety of other types of imaging techniques (e.g., optical, ultrasonic, thermal image, etc.). X-ray inspection control system 904 interfaces with PCB modeling system 902 and x-ray imaging system 906. For instance, x-ray inspection control system 904 may receive a file containing a computer model of a particular printed circuit board from PCB modeling system 902. Based on the computer model, x-ray inspection control system 904 may generate an inspection program to be implemented by x-ray imaging system 906. The inspection program may be used to image a manufactured printed circuit board, which is based on the computer model generated by PCB modeling system 902. After generating images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

As illustrated in FIG. 9, x-ray inspection control system 904 may implement graphical display manipulation system 110 in order to improve the inspection process and facilitate generation of the inspection program provided to x-ray imaging system 906. As described above generally, graphical display manipulation system 110 supports a graphical user interface configured for interaction with a user. In the embodiment illustrated in FIG. 9, graphical display manipulation system 110 may be configured to display a model of a printed circuit board. For instance, in the graphical display of a model of a printed circuit board, the one or more image objects may comprise a particular component on the printed circuit board, a pin on a particular component, a solder joint, etc. In order to generate the inspection program used to image a manufactured printed circuit board, which is based on the displayed computer model, graphical display manipulation system 110 enables a user to select one or more of the image objects of the printed circuit board. As stated above, due to the configuration of system 900, graphical display manipulation system 110 may be configured such that selection of the image objects by a user is limited to within the boundary of a target area also displayed on the graphical display. By manipulating the target area based on the image objects selected by a user as described above, graphical display manipulation system 110 may significantly improve the process of generating an inspection program for x-ray inspection system 904.

Figure 12:
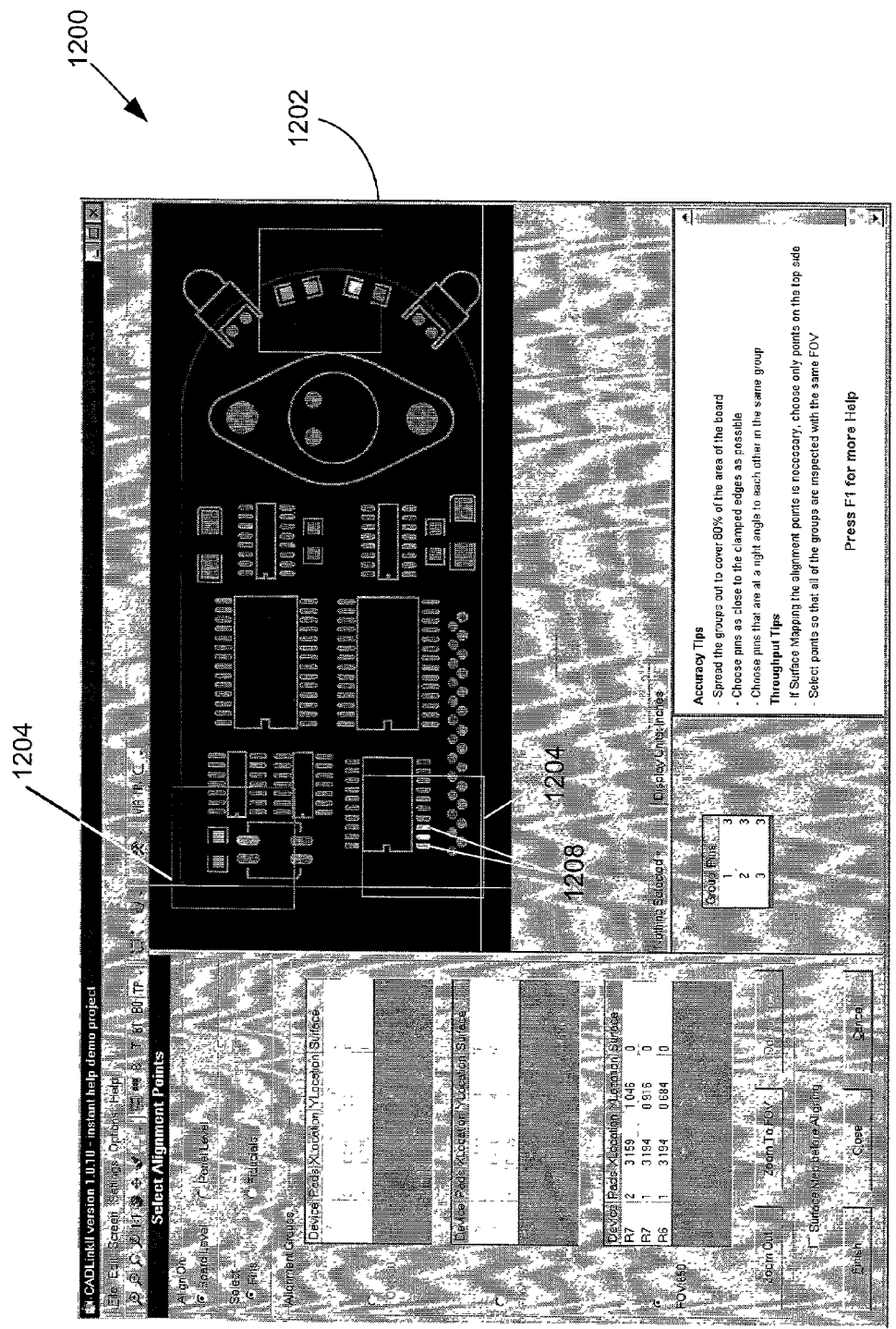
FIG. 12 is a screen shot of another embodiment of a graphical user interface generated by the graphical display manipulation system of FIGS. 1–3, which may be implemented in the x-ray inspection control system of FIG. 9.

FIG. 12 is a screen shot 1200 of another embodiment of a graphical user interface generated by graphical display manipulation system 110 and which may be implemented in x-ray inspection control system 904. The graphical user interface may comprise a portion 1202 for displaying the printed circuit board model. As described above, graphical display portion 1202 may further comprise one or more target areas 1204. The target areas 1204 may be manipulated as described above in response to user selections of image objects.

It should be emphasized that the above-described embodiments of graphical display manipulation system 110, particularly, any "described" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

What is claimed is:

1. A method for manipulating a graphical display of a printed circuit board model, the printed circuit board model adapted to be used in an automated x-ray inspection system for detecting defects in a manufactured printed circuit board having one or more components comprising one or more pins soldered to the printed circuit board, the method comprising the steps of:

providing a graphical user interface comprising a first portion for providing a graphical display of a printed circuit board model comprising a plurality of image objects associated with a printed circuit board;

receiving a user selection of a first image object in the first portion of the graphical user interface;

displaying a target area containing the first image object selected, the target area corresponding to a portion of the printed circuit board to be imaged by the automated x-ray inspection system;

receiving a user selection of a second image object in the first portion of the graphical user interface; and modifying the displayed target area such that the target area is automatically manipulated to contain the first and second image objects by centering the target area with respect to the first and second selected image objects.

2. The method of claim 1, wherein the step of modifying the displayed target area comprises displaying the target area such that the first and second image objects are contained within the target area and a maximum number of the image objects not selected are contained in the target area.

3. The method of claim 1, wherein at least one of the plurality of image objects comprises a family object that specifies a type of solder joint.

4. The method of claim 1, wherein at least one of the plurality of image objects comprises a package object that specifies a type of component.

5. The method of claim 1, wherein at least one of the plurality of image objects comprises a pin object that specifies a unique pin number for a specific component in the printed circuit board.

6. The method of claim 1, wherein the target area comprises a square.

7. The method of claim 1, wherein the step of receiving a user selection of a first image object and the step of receiving a user selection of a second image object is via a cursor manipulated by a mouse.

8. A computer program embodied in a computer-readable medium for manipulating a graphical display of a printed circuit board model, the printed circuit board model adapted to be used in an automated x-ray inspection system for detecting defects in a manufactured printed circuit board having one or more components comprising one or more pins soldered to the printed circuit board, the computer program comprising logic configured to:

provide a graphical user interface comprising a first portion for providing a graphical display of a printed circuit board model comprising a plurality of image objects associated with a printed circuit board;

receive a user selection of a first image object in the first portion of the graphical user interface;

display a target area containing the first image object selected, the target area corresponding to a portion of the printed circuit board to be imaged by the automated x-ray inspection system;

receive a user selection of a second image object in the first portion of the graphical user interface; and modify the displayed target area such that the target area is automatically manipulated to contain the first and second image objects area by centering the target area with respect to the first and second selected image objects.

9. The computer program of claim 8, wherein the logic is further configured to modify the displayed target area by displaying the target area such that the first and second image objects are contained within the target area and a maximum number of the image objects not selected are contained in the target area.

10. The computer program of claim 8, wherein at least one of the plurality of image objects corresponds to a solder joint.

11. The computer program of claim 8, wherein at least one of the plurality of image objects corresponds to a component.

12. The computer program of claim 8, wherein at least one of the plurality of image objects corresponds to a pin.

13. The computer program of claim 8, wherein the target area comprises a square.

14. The computer program of claim 8, wherein the logic is further configured to receive the user selection of a first image object via a cursor manipulated by a mouse.

15. A system for manipulating a graphical display of a printed circuit board model, the printed circuit board model adapted to be used in an automated x-ray inspection system for detecting defects in a manufactured printed circuit board having one or more components comprising one or more pins soldered to the printed circuit board, the system comprising:

- means for providing a graphical user interface comprising a first portion for providing a graphical display of a printed circuit board model comprising a plurality of image objects associated with a printed circuit board;
- means for receiving a user selection of one or more of the image objects in the first portion of the graphical user interface;
- means for displaying a target area such that the target area is automatically manipulated to contain one or more selected image objects and a maximum number of the image objects not selected are contained in the target area; and
- means for modifying the target area by centering the target area with respect to the first and second selected image objects;
- wherein the target area corresponds to a portion of the printed circuit board to be imaged by the automated x-ray inspection system.

16. The systems of claim 15, wherein at least one of the plurality of image objects corresponds to a solder joint.

17. The system of claim 15, wherein at least one of the plurality of image objects corresponds to a component.

18. The system of claim 15, wherein at least one of the plurality of image objects corresponds to a pin.

19. The system of claim 15, wherein the target area comprises a square.

20. The system of claim 15, wherein the means for receiving a user selection of one or more other image objects includes receiving the user selection of a first image object via a cursor manipulated by a mouse.

21. A system for manipulating a graphical display of a printed circuit board model, the printed circuit board model adapted to be used in an automated x-ray inspection system for detecting defects in a manufactured printed circuit board having one or more components comprising one or more pins soldered to the printed circuit board, the system comprising:

logic configured to:
- provide a graphical user interface comprising a first portion for providing a graphical display of a printed circuit board model comprising a plurality of image objects associated with a printed circuit board;
- receive a user selection of a first image object in the first portion of the graphical user interface;
- display a target area containing the first image object selected, the target area corresponding to a portion of the printed circuit board to be imaged by the automated x-ray inspection system;
- receive a user selection of a second image object in the first portion of the graphical user interface; and
- modify the displayed target area such that the target area is automatically manipulated to contain the first and second image objects by centering the target area with respect to the first and second selected image objects;

a processing device configured to implement the logic; and a display device configured to support the graphical user interface.

22. The system of claim 21, wherein the logic is further configured to modify the displayed target area by displaying the target area such that the first and second image objects are contained within the target area and a maximum number of the image objects not selected are contained in the target area.

23. The system of claim 21, wherein at least one of the plurality of image objects corresponds to a solder joint.

24. The system of claim 21, wherein at least one of the plurality of image objects corresponds to a component.

25. The system of claim 21, wherein at least one of the plurality of image objects corresponds to a pin.

26. The system of claim 21 wherein the target area comprises a square.

27. The system of claim 21, wherein the logic is further configured to receive the user selection of a first image object via a cursor manipulated by a mouse.

* * * * *

UNITED STATES PATENT AND TRADEMARK OFFICE
CERTIFICATE OF CORRECTION

PATENT NO. : 7,027,070 B2
APPLICATION NO. : 09/997859
DATED : April 11, 2006
INVENTOR(S) : Makinen It is certified that error appears in the above-identified patent and that said Letters Patent is hereby corrected as shown below:

On the Title page, in field (56), under "U.S. Patent Documents", in column 1, line 4, delete "Sciammarella" and insert --Sciammarella et al.--, therefor.

On the Title page, in field (56), under "U.S. Patent Documents", in column 2, line 4, after "6,760,890" delete "B1 *" and insert --B2 *--, therefor.

On the Title page, in field (56), under "U.S. Patent Documents", in column 2, line 9, after "2003/0082898" delete "A1" and insert --A1 *--, therefor.

On the Title page, in field (56), under "Other Publications", in column 2, line 1, delete "Labview Technical Resource," and insert --LABVIEW TECHNICAL RESOURCE,--, therefor.

On the Title page, in field (56), under "Other Publications", in column 2, line 1, delete "vol." and insert --Vol.--, therefor.

On the Title page, below field (56), in "Assistant Examiner", in column 2, line 1, delete "J. Amini" and insert --Javed A. Amini--, therefor.

In column 14, line 43, in Claim 26, delete "claim 21" and insert --claim 21,--, therefor.

Signed and Sealed this

Tenth Day of October, 2006

JON W. DUDAS
*Director of the United States Patent and Trademark Office*